United States Patent
Kapoor et al.

(10) Patent No.: US 9,472,017 B2
(45) Date of Patent: Oct. 18, 2016

(54) FAST RENDERING OF CURVED REFORMATION OF A 3D TUBULAR STRUCTURE

(71) Applicant: Siemens Aktiengesellschaft, München (DE)

(72) Inventors: Ankur Kapoor, Plainsboro, NJ (US); Andreas Meyer, Bubenreuth (DE)

(73) Assignee: Siemens Aktiengesellschaft, München (DE)

( * ) Notice: Subject to any disclaimer, the term of this patent is extended or adjusted under 35 U.S.C. 154(b) by 327 days.

(21) Appl. No.: 14/155,589

(22) Filed: Jan. 15, 2014

(65) Prior Publication Data

US 2014/0210821 A1 Jul. 31, 2014

Related U.S. Application Data (60) Provisional application No. 61/757,918, filed on Jan. 29, 2013.

(51) Int. Cl.
*G06T 15/08* (2011.01)

(52) U.S. Cl.
CPC ..... *G06T 15/08* (2013.01); *G06T 2207/30101* (2013.01); *G06T 2210/41* (2013.01); *G06T 2215/06* (2013.01)

(58) Field of Classification Search
None
See application file for complete search history.

(56) References Cited

U.S. PATENT DOCUMENTS

| | | | | |
|---|---|---|---|---|
| 4,821,214 A * | 4/1989 | Sederberg | | G06T 19/20 345/420 |
| 5,222,201 A * | 6/1993 | Lis | | G06T 19/00 345/420 |
| 2005/0249391 A1 * | 11/2005 | Kimmel | | G06T 7/0081 382/128 |
| 2005/0259854 A1 * | 11/2005 | Arimura | | G06T 7/0012 382/130 |
| 2006/0023925 A1 * | 2/2006 | Kiraly | | G06T 7/0081 382/128 |
| 2007/0001879 A1 * | 1/2007 | Kaftan | | G06K 9/6206 341/79 |
| 2007/0201737 A1 * | 8/2007 | Cai | | G06K 9/44 382/131 |
| 2007/0216678 A1 * | 9/2007 | Rouet | | G06T 7/0012 345/423 |
| 2007/0255133 A1 * | 11/2007 | Suhling | | A61B 6/463 600/425 |
| 2007/0276214 A1 * | 11/2007 | Dachille | | G06T 7/0012 600/407 |
| 2008/0273777 A1 * | 11/2008 | Luboz | | G06T 7/0081 382/130 |
| 2008/0317308 A1 * | 12/2008 | Wu | | G06K 9/4638 382/128 |
| 2010/0239140 A1 | 9/2010 | Ruijters et al. | | |
| 2011/0135186 A1 | 6/2011 | Bakker | | |
| 2013/0202170 A1 * | 8/2013 | Blezek | | G06T 7/0093 382/131 |
| 2014/0119623 A1 * | 5/2014 | Mostafavi | | G06T 5/002 382/131 |

\* cited by examiner

*Primary Examiner* — Carlos Perromat (57) ABSTRACT

Various improvements may lead to reducing or avoiding artifacts in curved planar reformation imaging. The source of voxels used in projection rendering may be verified to be from the vessels rather than intervening anatomy. To make the check more rapid, a hierarchal data structure may be used. Rather than using the vessels, geometric forms fit to the vessels may be used. Processing with geometric forms may be more rapid than a fine mesh or surface. Since tubular structures have a predictable change over length, the geometric forms or the vessel data itself may be filtered with a monotonicity constraint. Instead of using planes for segments based on the lumen or center line, a convex hull around the tubular structures is formed for the curved planar reformation.

19 Claims, 4 Drawing Sheets

FAST RENDERING OF CURVED REFORMATION OF A 3D TUBULAR STRUCTURE

RELATED APPLICATIONS

The present patent document claims the benefit of the filing date under 35 U.S.C. §119(e) of Provisional U.S. Patent Application Ser. No. 61/757,918, filed Jan. 29, 2013, which is hereby incorporated by reference.

BACKGROUND

The present embodiments relate to medical imaging and, in particular, to curved reformation.

The vascular system may be imaged non-invasively using computed tomography (CT) and/or magnetic resonance imaging (MRI). Both CT and MRI provide high-resolution volumetric information for visualizing anatomical objects (e.g., heart chambers and vessels). CT may be used in conjunction with a "live" modality, such as fluoroscopy. For these types of imaging, projection images during the procedure are common. The CT and MRI data often contains too much information, so selection of part the information for display during the "live" procedure is valuable.

One of the established methods to display tubular information is to generate longitudinal cross sections intersecting the lumen (e.g., center line), wall, and surrounding tissue in a plane. If the vessel is considered to be made of many small segments, then this longitudinal cross-sectioning plane continuously orients itself to align with the segments. The resulting sub-set of the volume defined by the planes is rendered. This technique is commonly referred as curved planar reformation (CPR).

Figure 1:
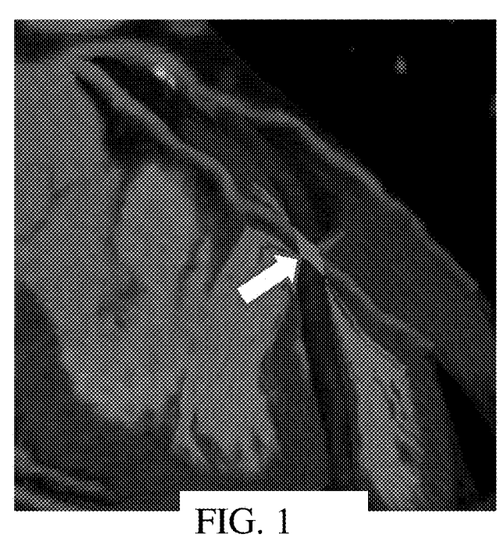
FIG. 1 is an example multi-path curved multi-planar reformation image with an artifact.

CPR may be extended to include multiple planes for different vessels, and the resultant image is rendered an algebraic combination of the voxel intensities on these multiple planes (e.g., maximum intensity or minimum intensity selected along a path through the multiple planes). This approach is known as curved multi-planar reformatting (CMPR). However, in CMPR, parts of the vessels might be superimposed by other vessels depending on the respectively selected intersecting planes. FIG. 1 shows a significant artifact (see the arrow) when there is superimposition of two vessels and the intervening space has some source of "noise," such as a heart chamber filled with contrast or other foreign bodies (e.g., a stent). In this particular instance two vessels are superimposed. The vessel at the back has low contrast due to poor blood flow, such as caused by a blockage. The space in between these two vessels has the heart chamber, which is filled with contrast medium. The arrow shows the sharp change in contrast (e.g., a parallelogram shaped region) of intersection that does not match intensity of either of the vessels. Other artifacts may be result in CMPR.

BRIEF SUMMARY

By way of introduction, the preferred embodiments described below include methods, computer readable media, and systems for curved reformation imaging. Various improvements may lead to reducing or avoiding artifacts. The source of voxels used in projection rendering may be verified to be from the vessels rather than intervening anatomy. To make the check more rapid, a hierarchal data structure may be used. Rather than using the vessels, geometric forms fit to the vessels may be used. Processing with geometric forms may be more rapid than a fine mesh or surface. Since tubular structures in anatomy have a predictable change over length, the geometric forms or the vessel data itself may be filtered with a monotonicity constraint. Instead of using planes for segments based on the lumen or center line, a convex hull around the tubular structures is formed for the curved planar reformation.

In a first aspect, a method is provided for curved reformation imaging. A processor fits geometric forms to outer wall segments of a vessel tree of a patient represented by scan data. The processor generates a convex hull from the geometric forms. The processor identifies the scan data that represents the convex hull. An image is rendered from the identified scan data.

In a second aspect, a non-transitory computer readable storage medium has stored therein data representing instructions executable by a programmed processor for curved reformation imaging. The storage medium includes instructions for obtaining data representing a volume of a patient with at least one tubular structure, creating a sub-volume with curved reformation along the at least one tubular structure, rendering an image of the volume from the sub-volume wherein the rendering is a function of whether the voxels of the sub-volume are in or out of the at least one tubular structure, and displaying the image.

In a third aspect, a system is provided for curved planar reformation imaging. A memory is operable to store data representing multiple tubular structures and intervening anatomy. A processor is configured to filter radii along of each of the multiple tubular structures with a monotonicity constraint and configured to perform the curved reformation of the data as a function of the filtered radii. A display is configured to display an image of the curved planar reformation.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Figure 2:
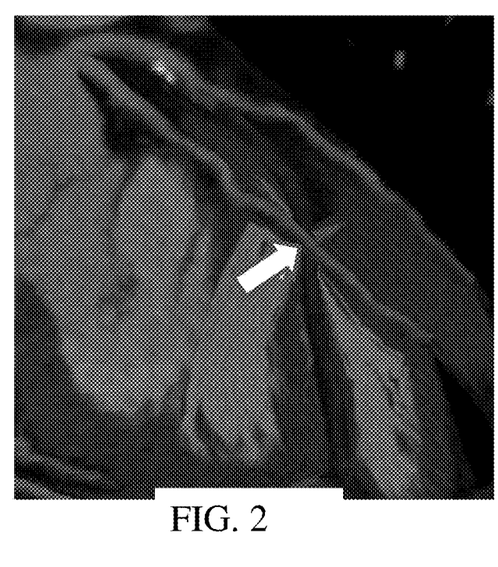
FIG. 2 is an example corresponding to the image of FIG. 1, but with processes to render without the artifact.

FIG. 2 shows an example of the image of FIG. 1, but created with a curved reformation using processes to avoid the artifact shown in FIG. 1. The noise from the intervening contrast agent in the heart chamber is rejected, instead using the intensities from the non-blocked vessel. The arrow indicates the same location as in FIG. 1. To achieve the result, the location of the voxel used in the projection is checked. A novice or simple approach is to check each point along the path between the nearest and farthest point to determine whether the point lies inside the tubular tree-like structure. Points that do not lie in the tubular structure are excluded from the rendering combination or algebraic computation of projected pixel intensity. The computation time for this check may be prohibitively long, delaying generation of the image and may not be fast enough for interactive rates.

Fast rendering of multi-path curved reformation of three-dimensional tubular structures with consideration for inclusion of voxels volume inside and outside the tubular structure is provided. The proposed approach achieves interactive rates and/or removes sources of common artifacts by adopting one or more strategies.

In a first strategy, a hierarchical data structure is used to manage three-dimensional spatial partitioning of the tree-like structure for rapid checking. A two-dimensional projective reformation of a voxel volume that highlights the blood vessel's tubular structure is rendered by selecting rendered pixels values from the intensity values within the tubular structure. The hierarchical organization of tubular structure in terms of three-dimensional spatial geometric primitives facilitates rapid checking to restrict intensities used for rendering to arising from within the tubular structure. Without this selection, artifacts, especially when there are two vessels that are separated by some distance with intervening contrast or stents, result.

In a second strategy, the hierarchical organization may be used to remove obscuring information. Smaller vessels may obscure the view of larger vessels. The hierarchal organization separates larger and smaller tubular structures, such as into two or three size ranges. This separation may be used to render from only tubular structures of a desired size range, such as only large vessels.

In a third strategy, candidate paths are filtered to smooth the tubular structure. To enhance the visual appeal of the projective image and to avoid artifacts in the final image arising from sharp transitions and/or variations in the three-dimensional structure, the tubular structure lumen is modified in pre-processing to be monotonic along each of its curved paths. The monotonicity constraint provides a natural smooth contour to visualized structures. When the tubular structure contains foreign objects, such as stent, and/or the input segmentation has under or overestimated the exact lumen, the reformatting leads to an unnatural view where the structure is enlarged or narrowed. The constraint may avoid this artifact.

Figure 3:
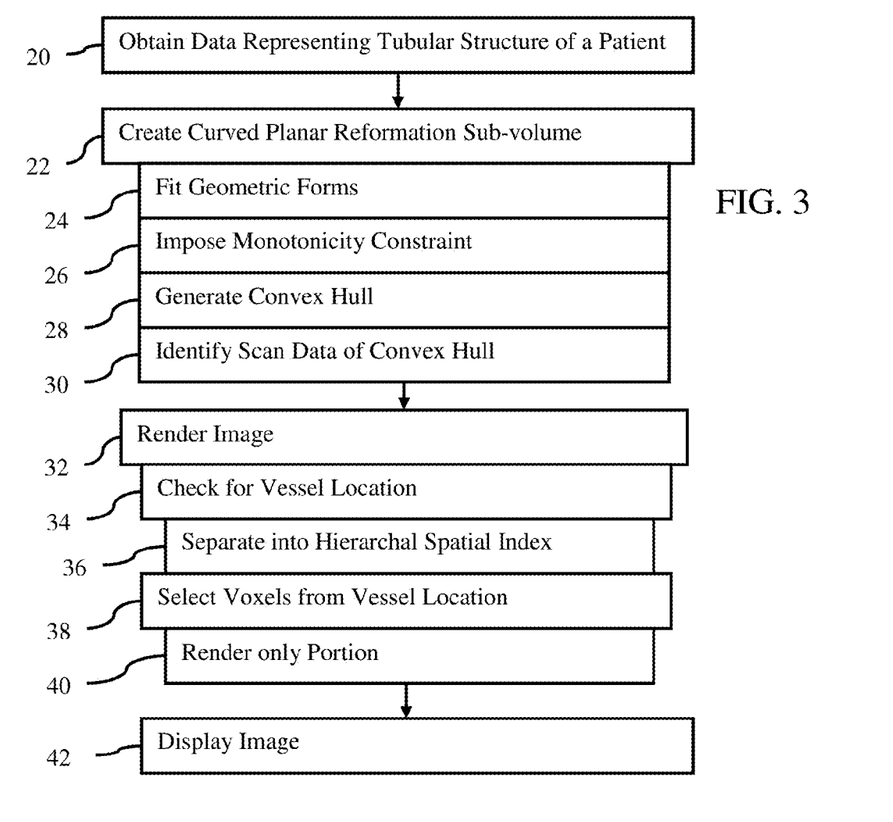
FIG. 3 is a flow chart diagram of one embodiment of a method for curved reformation imaging.

FIG. 3 shows one embodiment of a method for curved reformation imaging. Instead of using simple planar-longitudinal cross sections through the centerlines of lumen segments to define the data used for rendering, geometric primitives are fit to the tubular structures. The fit or the data being fit may be filtered with a monotonicity constraint. A convex hull is formed around the geometric primitives and between the primitives of the various branches of the tubular structure. For rendering paths through tubular structure, the rendering is performed for voxels confirmed to be from the tubular structure using a hierarchal spatial index of the geometric forms. Only one or two of these strategies may be used in other embodiments.

Additional, different, or fewer acts may be performed. For example, act 24 is not performed where the data itself is used instead of fitting geometric forms. The other acts would also use the data instead of the geometric forms. As another example, the spatial filtering and/or monotonicity constraint of act 26 is not imposed. In yet another example, centerline longitudinal planes for each segment are used instead of forming the convex hull of act 28 and instead of identifying data of the convex hull of act 30. The location check of act 34 may be performed without the hierarchal spatial index of act 36, such as using a novice approach. Any combination of these differences may be used. In yet another example, the selection of a sub-set of the sub-volume or curved reformation of act 40 is not performed.

The method is implemented in the order shown or a different order. For example, the imposition of the monotonicity constraint of act 26 may be performed as a separate filtering act prior to creating the curved planar reformation sub-volume of act 22 and/or the fitting of act 24. The scan data may be filtered to impose the constraint. In another example, the enforcement of the constraint of act 26 occurs simultaneously with the fitting of act 24, such as where the constraint is a term in the cost function of the fitting.

The acts are performed in real-time, such as during a surgical procedure. Performing during the procedure allows the clinician to view context information about the tubular structures while operating. In other embodiments, the acts are performed off-line, such as before or after the procedure. The acts may be performed for planning or result determination, such as performing as part of a review.

Whether real-time or not, rendering at interactive speeds may be provided. For example, the user may cause the view to rotate or may cause a change in segmentation. The curved reformation images are displayed at ten or more (e.g., fifteen or twenty or more) frames a second while still avoiding artifacts from intervening structures during this interaction. Instead of displaying at an interactive rate, images may be generated at less than ten frames a second.

The acts are performed automatically by a processor. The user causes the patient to be scanned or obtains scan data for the patient from a previous scan. The user may activate the process. Once activated, the method is performed without any user input or may be performed as the user interacts with the rendering. Other user input may be provided, such as for changing modeling parameter values, correcting detected locations, and/or to confirm accuracy. The processor performs one or more of the acts, such as performing acts 22-30. The same processor or a different processor (e.g., graphics processor) performs acts 32-40. Act 20 is performed by the processor or by the user. Act 42 is performed by a display device.

In act 20, data representing a patient is obtained. The data is acquired by scanning the patient. Any type of medical imaging data may be used. For example, computed tomography (CT) like, C-arm x-ray, standard x-ray, CT, or MRI data is acquired. Any scanning sequence or approach may be used, such as a cardiac scan.

In an alternative embodiment, the data is acquired by loading from memory. Data from a previously performed scan of the patient is stored in a memory, such as a picture archiving and communications system (PACS) database. The data is selected from the database. The data may be obtained by transfer, such as over a network or on a portable memory device.

The data represents a volume that includes a tubular structure. The data is organized or formatted as a frame, set of data, sets of data, or other collection to represent the volume. The data represents locations distributed in three dimensions. The locations correspond to any type of anatomy, including tubular structures.

In one embodiment, the scan data represents one or more branches of a vessel tree, such as representing a vessel tree with two, three, or more branches near or connected with the heart. The tubular structure may be for multiple, different trees, such as vessel trees for veins and arteries. The tubular structure may be other than a cardiac structure, such as part of the digestive system. Other anatomy of the patient volume is also represented by the data, such as data representing the heart walls, heart chambers, other parts of the heart, lungs, ribs, bone, muscle, skin, and/or other tissue. Contrast agent perfused or positioned within any of the anatomy may be represented. Non-native structures, such as stents, pace makers, electrodes, or catheters may be represented by the data.

For imaging the tubular structure, the data as obtained is segmented or labeled. A segmented tubular structure is provided as an input. The intensities or scan data representing the tubular structure are distinguished from intensities or scan data representing other anatomy or objects. The scan data for different anatomy is obtained as different spatially related sets or is one set of data with flags or other indicators of locations for tubular structure. In other embodiments, segmentation is performed or other detection is used to identify locations of the tubular structure in the obtained data.

In act 22, a sub-volume is created with curved reformation. Rather than using all of the data representing the volume, only a portion or sub-volume is used. The data associated with desired anatomy is selected using curved reformation. The sub-volume is created by selecting for processing or using for rendering data along or of the tubular structure plus associated data. For example, data representing all or part of the tubular structure and only some of the data outside the tubular structure forms the sub-volume.

In one embodiment, any now known or later developed curved planar reformation and/or curved multi-planar reformation is used. In another embodiment, geometric forms are fitted in act 24 and/or a convex hull is generated in act 28 to identify the sub-volume in act 30.

For fitting in act 24, the tubular structure is divided into segments. Each tubular path is separated into a sequence of segments. Any size may be used, such as every N millimeters along the center line. Each branch is divided into segments. These individual parts of the tubular structure form an ordered sequence from one end to another. Each segment includes the outer wall of the tubular structure and the center line, but inner wall or other portion may be used.

Any geometric form may be used for fitting, such as any convex form. The geometric form does not have any concavity, but may in alternative embodiments. For example, a cylinder, truncated cone, or n-sided prismoid is used. The same geometric form is fit to each segment (e.g., a truncated cone fit to each segment). Alternatively, different geometric forms are used for different segments, such as having a different form for the beginning and/or end of the tubular structure (e.g., truncated cones along the vessel with a full cone for the end). The geometric form is a geometric primitive representing the vessel, but with less detail. This simplification may allow for faster computation of ray-object intersection as well as for computing if a point is inside or outside the object than if the segmentation of the scan data were used.

The geometric forms are fit to the outer wall segments of the tubular structure (e.g., vessel tree). By fitting the form to each of the segments, a model of the tubular structure formed by connected or a sequence of fit forms results. The sequence of representations of a geometric shape (e.g., sequence of truncated cones) represents the tubular structure.

Any fitting may be used. For example, the center of the geometric form is placed at the center of the lumen for the segment. A radius or radii at the ends, center, or other location of the geometric shape is fit to the radius of the segment of the tubular structure. An average radius about the circumference at the centerline location may be used. Correlation or other techniques to find translation, rotation, and/or scale for a best fit may be used. In one embodiment, the center of geometric form is placed at the center of the lumen. The radius or radii that minimize the sum of squares of distance between points on the outer surface of the lumen and the outer surface of the geometric form are then found. Alternatively, if the lumen is provided in a triangular or polygonal mesh form, the sum of squares of distance between the polygonal mesh surfaces and the outer surface or the geometric form being fitted may be used.

The radius of the tubular structure as represented by the scan data may vary in undesired ways. Tubular segmented structures, such as vessel trees, often have sharp transitions and/or do not impose any constraints on the diameter of tubular lumens along the paths. Similarly, other structures, such as stents, may cause artifacts associated with expansion or narrowing. This may result in "unnatural" visualization of the structure since anatomic tubular structures (e.g., blood vessels) by nature tend to be smooth and monotonic. The tubular structure tapers gradually over distance.

Figure 4:
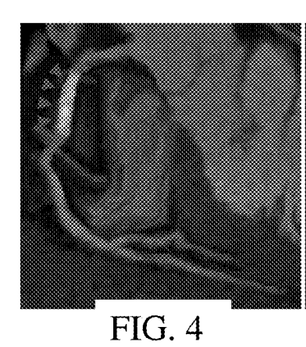
FIGS. 4 and 5 illustrate an example of a multi-path curved multi-planar reformatted image with an expansion artifact due to a stent and an image without the artifact, respectively.

FIG. 4 shows an artifact (see arrows) due to the presence of a stent. Combining voxel intensities to produce multi-path curved multi-planar reformatting (multi-path CMPR) may result in the artifact. Without voxel selection and monotonicity, the resultant image shows a narrowing and "unnatural" lumen of the vessel at locations of the foreign objects (i.e., the stent).

Figure 6:
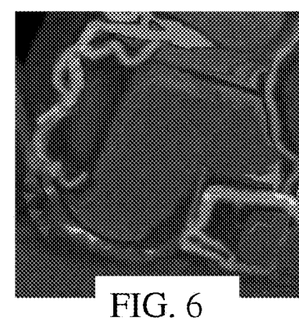
FIGS. 6 and 7 illustrate an example image of a multi-path curved multi-planar reformatted image with a narrowing artifact and an image without the artifact, respectively.

FIG. 6 shows an artifact (see arrows) due to non-smooth non-monotonic changing tubular structure. Typically, the tubular structures as represented by the scan data are produced by automated processing of volumetric Ct or MRI data, followed by some corrections to centerlines and/or lumen radius by trained users. Even though the input provided might match the correct lumen size at that location, it may not be ideal for visualization of multi-path CMPR. Such non-smooth changes cause the multi-path CMPR to pick up intensities values along planes that lead to either apparent shrinkage of vessel lumen in multi-path CMPR or over sampling around small vessels. In FIG. 6, the "unnatural" shrinking is due to (a) a blocked vessel which has less contrast than usual, (b) branches that arise from the main vessel contributing to "noise" from the innerving space, and/or (c) non smooth, non-monotonic vessel lumen diameter of the tubular structure input.

To improve the visual appeal as well as to avoid artifacts in the final rendered image, a monotonicity constraint is imposed on the radius of the lumen in act 26. The constraint is imposed on the tubular structure. In one embodiment, the radii along each branch (e.g., sequence of radii for the sequence of segments) are low pass filtered directionally and prevented from either increasing or decreasing, depending on the direction. In embodiments using the geometric forms, the constraint may be enforced on the radii of the fit forms along the branches of the vessel tree. Both approaches may be used, such as filtering the radii from the scan data and also assuring that the fit has monotonicity. The constraint may be imposed by enforcing monotonicity of the radii without filtering the radii. In other embodiments, filtering may be performed without imposing the monotonicity constraint.

Figures 8, 9:
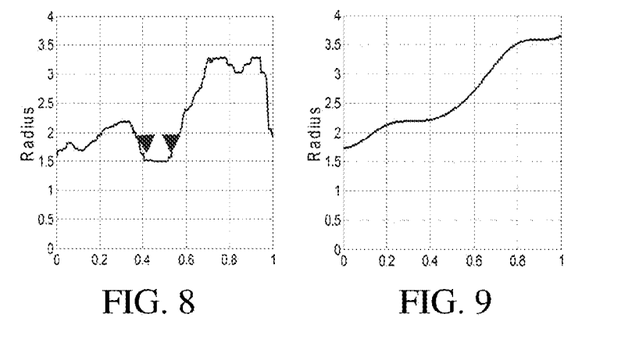
FIGS. 8 and 9 represent example vessel radii over length prior to filtering and after filtering with a monotonicity constraint, respectively.

In one embodiment, regions that cause the artifact are filtered out using the monotonicity constraint. FIG. 8 shows example radii of an input lumen of a main vessel in FIG. 6 as the main vessel radius varies along the length of the vessel starting at end of vessel (0 on x-axis) to beginning at ostia (1 on x-axis). The portion of blocked vessel is indicated by arrows in FIGS. 8 and 6. Low pass filtering removes high frequency variation in the radii. Any low pass filtering may be used, such as a local polynomial regression (e.g., Savitzky-Golay smoothing filter). The filtering is performed in conjunction with a polynomial regression with monotonicity constraint, which enforces that all values of the radii along the x-axis are greater than or equal to the preceding values (i.e., $f(i)>=f(j)$ for all $i>j$ where f is the radii and i and j are spatial indexes). The result of the filtering the radii with the monotonicity constraint is shown in FIG. 9. These filtered radii are used for further processing, such as for the fitting of the geometric form.

Figure 5:
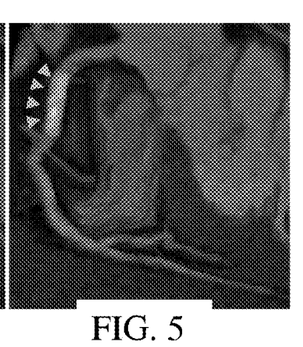
Figure 7:
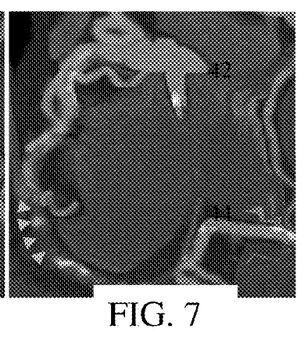

FIG. 5 shows the image of FIG. 4, but with fast voxel selection (e.g., only using voxels from the tubular structure for tubular structure image locations) and filtering with the monotonicity constraint. The unnatural narrowing at the arrows is removed. FIG. 7 shows the image of FIG. 6, but with fast voxel selection and filtering with the monotonicity constraint. The shrinking caused by the artifact is removed or reduced. Rather than CMPR, the convex hull approach is used for FIGS. 5 and 7.

Referring again to FIG. 3, the sub-volume is identified from the tubular structure, either as segmented in the scan data or as represented by the fit geometric forms, both with or without imposition of the monotonicity constraint. An example using the geometric forms is provided below.

In act 28, a convex hull is generated to fit to the tubular structure. The convex hull fits around the multiple branches, so extends between the branches. The convex hull models formation of an elastic material around and between the geometric forms. For example, a shrink wrap is positioned over the sequences of geometric forms and shrunk. This results in surfaces partly around (e.g., at least contacting the exterior of the lumen or geometric form) the tubular structure and stretched between the branches of the tubular structure as well as between parts of a curving branch. Other approaches to define the tubular structure and surfaces extending between the tubular structures may be used.

In alternative embodiments, longitudinal planes aligned with the centerline of the lumen or fit geometric forms without convex hull generation are used to define the sub-volume. Any now known or later developed CPR or CMPR approach to define the locations in the volume relative to the curving path may be used.

In act 30, scan data representing locations along the convex hull or other designator of the sub-volume is identified. The sub-volume is created in act 22 from the curve reformation, such as using the convex hull generated around the fitted sequence of the representations of the geometric shape. Scan data representing the convex hull is identified and selected for rendering. Scan data not representing the convex hull or other definition of the CPR sub-volume is not selected and/or not used for rendering.

Where a give voxel is intersected by the convex hull, the voxel is used. If not intersecting, the voxel is not used. In other embodiments, a regular mesh is created on the convex hull and interpolation is used to determine the intensity at the mesh nodes. The voxels in the neighborhood, even if not intersected by the convex hull, may be used for the interpolation to the convex hull.

In act 32, an image is rendered from the sub-volume. The identified scan data is used to render the image. The volume of the patient, including the tubular structures, is imaged using the scan data for the sub-volume. Voxels in the sub-volume are used for rendering, and voxels not in the sub-volume are not used.

The image includes information from the tubular structure as well as other anatomy and/or objects. For pixels of the image associated with tubular structure, the voxels from the tubular structure and not from other anatomy are used for rendering. Unwanted voxel intensities may be contained within its convex hull, for example, arising from contrast in chambers of the heart. This results in an image artifact that may lead to incorrect information being displayed to the user (see FIG. 1).

The avoid this artifact, a check is performed in act 34 to assure that the intensity used for rendering the tubular structure portion of the image is from voxels of the tubular structure and not voxels out of the tubular structure. The processor determines whether the identified scan data along each of a plurality of rendering paths belongs to the vessel tree and renders only from the identified scan data belonging to the vessel tree when available along the rendering path.

If information for structures other than the tree-like vessel is available, the information from the other structures may be used for filtering candidate paths. Examples of such structures are the chambers of the heart or stents. An intersection of the rendering path with the other structure determines if the rendering path should be investigated further. Alternatively, the check is whether the rendering path passes through the tubular structure. For any locations where the rendering path both intersects the tubular structure and other anatomy, voxels just from the tubular structure are selected and used for rendering in act 38. If the rendering path does not intersect the tubular structure, the other information is used. If the rendering path only intersects the tubular structure, then the information from the tubular structure is used. This check is performed for each voxel from the sub-volume of each rendering path.

Checking each voxel of each rendering path as being in or out of the tubular structure may be processing intensive. In another embodiment, the check uses a hierarchal spatial index in act 36 and/or the geometric forms (e.g., fit primitives) to simplify the checking. "Noise" may be reduced or eliminated from the resultant or rendered image using a rapid, more quickly performed, or less processing approach.

A series of checks are performed. A check is made about whether a given rendering path intersects just a tubular structure, just other structure, or both. If both, another check is performed for each voxel of the sub-volume along the rendering path using the hierarchal spatial index. In other embodiments, different checks are used.

The check for structure intersection with the rendering path may be simply a check of each voxel along the path. Path intersections to determine if a point on the path is inside a non-convex shape, such as the tree-like vessel structure, are computationally expensive.

Alternatively, more rapid checking may be performed. The more rapid checking rejects outlying intensities or voxels using the hierarchical organization of interior of vessel. The rapid checking is performed by locating the nearest and farthest voxels in the sub-volume along the rendering path. The most distant and closest intensities of the sub-volume along the view direction are found. The distance between the nearest and farthest voxels is determined.

The distance is compared to a threshold set based on the tubular structure. Any threshold may be used, such as a threshold set based on the resolution of the scan data (e.g., size of the region represented by each voxel) and based on the expected radii of the tubular structure. Prior knowledge of typical diameters of the vessels may be used. The threshold may be different for rendering different parts of the tubular structure.

If the distance is zero (e.g., intersects the convex hull only between tubular structures) or is at or less than a typical or other radius of the tubular structure, then the information may be from just one type of structure. Maximum intensity or other projection may be performed along the rendering path without risk of an artifact from multiple structures represented by the sub-volume.

If the distance is greater than associated with the tubular structure, then information from outside at least one branch exists along the rendering path. Maximum intensity or other projection may result in higher or other intensities from non-tubular anatomy where the goal is to show the tubular anatomy. If the distance along the rendering path between nearest and farthest point is larger than this threshold, the intervening space may contain additional structures and further investigation along the rendering path is triggered. The projection rendering of act 32 uses selected voxels from act 38 to render the sub-volume associated with the tubular structure and not from voxels or scan data representing locations outside the vessel tree for the given rendering path.

The distance check may trigger a further check if the distance is greater than the threshold. The further check examines each voxel or intensity along the rendering path. The information in the sub-volume for the view direction is checked to determine whether the information is from the tubular structure or other anatomy. Each voxel may be checked along each triggered rendering path.

Alternatively, further processing and/or time savings is provided using hierarchal spatial indexing. For hierarchal spatial indexing, the geometric forms or vessel segments are separated into a hierarchal spatial index of progressively smaller sub-divisions. Any number of sub-divisions may be used, such as one, two, three, or more. In one example, the volume represented by the sub-volume is divided into eight equally sized and shaped regions, providing the original volume and one sub-division. Division by eight creates an octree data structure. Another sub-division is provided by separating each of the eight regions into eight smaller regions. Each internal node has exactly eight children. The three dimensional space is partitioned by recursively sub-dividing the space into eight octants. Alternatively, a kd-tree is used instead of octree. The kd-tree rotates and/or scales the separate regions relative to the tubular structure. The kd-tree may be advantageous when the input centroids have a skewed distribution in space and are more localized in one region of 3D space. Octrees are advantageous for a uniform distribution.

Each of the geometric forms is indexed as belonging to a given sub-division at each level. The centroids of each of the geometric forms are stored in the octree or kd-tree as the spatial index.

This hierarchal data structure is used to select voxels as belonging or not belonging to tubular structure. Once a rendering path likely intersecting more than one type of structure is identified, the voxels along the rendering path are checked using the hierarchal spatial index. The position of each voxel relative to the geometric form or representation of the tubular structure in found. Rather than checking each of the geometric forms, only the geometric forms in the region of the hierarchal spatial index in which the voxel resides are checked. To check if a point along a rendering path is inside vessel, an efficient nearest neighbor query within a predefined radius is used. The radius may be set or adjusted based on the resolution of the voxel spacing and/or the geometric forms (i.e., primitives) used to subdivide the tubular structure. The nearest neighbor search is implemented using the hierarchy. Any nearest neighbor searching of octrees or kd-trees may be used.

The hierarchy is used to determine which of the smallest regions should be used to run the check. The check begins with the coarsest level, which may have 8 sub-divisions. The index of the sub-division that constrains the voxel point is identified and selected. If this is not the smallest sub-division, then this process is repeated.

If a geometric form is not located in the highest resolution (i.e., region of the smallest sub-division), then the voxel is not from the tubular structure. If geometric forms are in the region, then a small number of centroids indexed to the corresponding geometric forms are identified. The voxel is checked to see whether the voxel is on or within the geometric forms of that region. This avoids searching for and/or checking against geometric forms of other regions. If the voxel is within or on one of the geometric forms of the region, then the voxel is considered as part of the tubular structure. If part of the tubular structure, the intensity value at that point is used in computation of the projected pixel intensity. If the voxel is outside of geometric forms of the region, then the voxel is considered to not belong to the tubular structure. This voxel is ignored in favor of another voxel along the rendering path that belongs to the tubular structure. If none of the voxels along the rendering path belong to the tubular structure, then the rendering is performed using all of the voxels.

Using the hierarchal spatial index saves processing and/or time. With the kd-tree, the operation has a complexity of $O(\log N)$, if the centroids are uniformly randomly distributed. The worst case is $O(N^{2/3})$, where N is a number of geometric shapes used to represent the vessel tree. A search without the use of any such hierarchal structures is $O(M)$, where M is number of voxels that belong to the interior of the tubular structure. Typically, M is far greater than N.

In act 32, the sub-volume is rendered from rendering paths, view directions, or projection rays. For rendering paths where selection of voxels occurred, the rendering uses intensities from the tubular structure. For other rendering paths, the intensities along the path are used. The sub-volume created by the CPR is rendered. Any type of projection rendering may be used, such as maximum intensity projection. The maximum intensity along the rendering path is selected to use for generating a pixel of the image. Minimum, alpha blending or other projection rendering may be used. The rendering is relative to a view direction that may be established by the processor and/or the user. For any given change in view direction, the rendering paths change and the rendering process is repeated. In alternative embodiments, the sub-volume is used as a surface texture and surface rendering is used. Lighting models may be used in the rendering.

Figure 10:
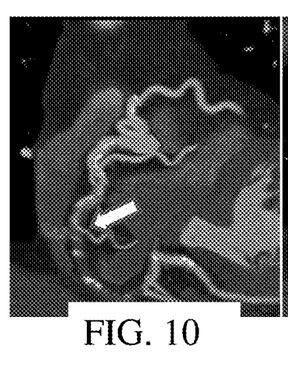
FIGS. 10 and 11 illustrate example images of a multi-path curved reformatted image with small and large vessels of the vessel tree and without the small vessels, respectively.

The rendering provides a two-dimensional representation of the volume of the patient. The rendering represents the tubular structure and surrounding anatomy. Since the sub-volume is created based on the tubular structure, the tubular structure is emphasized in the image or more likely included in the image. For example, FIG. 10 shows an image of a vessel tree around the heart. The larger vessel includes a blockage or area of little flow or contrast. Various branches are included in the trees structure, including a branch appearing to extend from a beginning of the blockage (see the arrow in FIG. 10).

Figure 11:
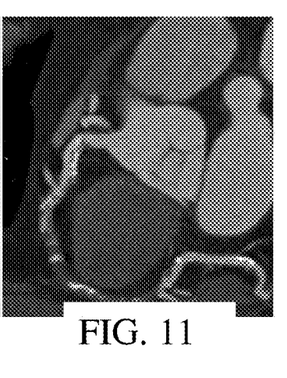

In optional act 40, only a portion of the sub-volume may be selected or used for rendering. Rather than rendering all of the tubular structure, parts of the tubular structure are selected or deselected for rendering. For example, only tubular structures above a given size are selected for rendering. In the example of FIG. 10 of a rendering of the complete coronary vessel tree, the small vessel branch extending from the end of the blockage actually obscures part of the blockage, resulting in a lack of ability to tell the extent of the blockage. In an interventional setting where the user is using the image to make an informed decision, it is important to provide tools that may quickly toggle the visibility of some of the paths as desired by the user. By rendering just the larger vessels, the small vessel branch is excluded. Data from the small vessel branch is not used for the projection. As a result, a more accurate representation of the extent of the blockage is shown in FIG. 11.

To easily select the vessels being rendered, the hierarchal (tree-like) data structure may be used. A sub-set of the geometric forms is selected based on membership in the sub-divisions (tree branch). Scan data associated with the desired geometric forms is selected and used for rendering while scan data of the sub-volume associated with other geometric forms is not selected and not used in the rendering. The hierarchical or tree-like organization of geometric forms or primitives representing the tubular structures enable rapid toggling of vessel visibility in the multi-path CMPR at fast interactive rates. This tree-like organization is of the vessel or tubular structures. For example, the heart vessel as right and left main coronaries, then right main has a branch_1 at xr1,yr1,zr1 location, branch_2 at xr2,y2,zr2 location and so on. Associated with each branch of this structure are indexes that correspond to geometric forms. For example, geometric forms 1-100 have membership of right main coronary, and geometric forms 101-201 have membership of right branch_1 and son on. Conversely, using a triangular mesh or the geometric forms without the hierarchal spatial index necessitates more complex processing or user indication of the vessels to deselect.

In act 42, the rendered image is displayed. The rendered image includes pixel intensities mapped to display values. The image is a two-dimensional image of the tubular structure, surrounding anatomy, and any foreign structures. The image is generated from the scan data, but may be generated from the fit geometric forms. Other information may be included, such as graphic overlays or image data from other modalities of imaging.

Image processing may be applied to the scan data before rendering the image or applied to the rendered image. For example, the pixels representing tubular structure may use a different mapping, such as color coding, to highlight the tubular structure. As another example, spatial filtering is performed.

The image is shown alone. A sequence of such images may be shown, such as rendering from a sequence of different view directions. Alternatively, the image or images are shown with other information. The image may be separate but share the display screen with an image generated from fluoroscopy, ultrasound, or other "real-time" modality.

In alternative or additional embodiments, the sub-volume information is used for quantification. A volume, area, length, curvature, or other quantity is calculated using the locations and/or shape of the tubular structure.

Figure 12:
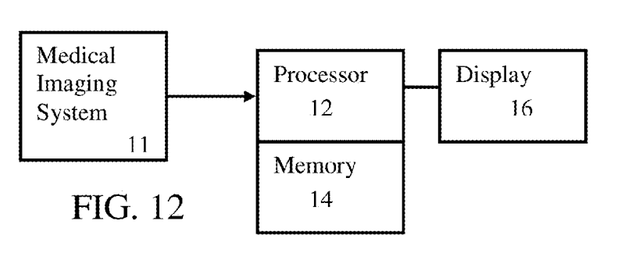
FIG. 12 is a block diagram of one embodiment of a system for curved reformation imaging.

FIG. 12 shows a system for curved reformation imaging. The system includes a medical imaging system 11, a processor 12, a memory 14, and a display 16. The processor 12 and the memory 14 are shown separate from the medical imaging system 11, such associated with being a computer or workstation apart from the medical imaging system 11. In other embodiments, the processor 12 and/or memory 14 are part of the medical imaging system 11. In alternative embodiments, the system is a workstation, computer, or server for curved reformation or multi-path curved reformation from data acquired by a separate system in real-time or using previously acquired patient-specific data stored in a memory. For example, the medical imaging system 11 is provided for acquiring data representing a volume, and a separate database, server, workstation, and/or computer is provided for curved reformation. Additional, different, or fewer components may be used.

The computing components of the system, such as the medical imaging system 11 and/or the processor 12 are configured by hardware, software, and/or circuit design to perform calculations or other acts. The computing components operate independently or in conjunction with each other to perform any given act. The act is performed by one of the computer components, another of the computing components, or a combination of the computing components. Other components may be used by the computing components to scan or perform other functions.

The medical imaging system 11 is any now known or later developed modality. The medical imaging system 11 scans the patient at locations associated with tubular structure, such as the cardiac, digestive, or nervous system within the patient. For example, a C-arm x-ray system (e.g., DynaCT from Siemens), CT like system, or CT system is used. Other modalities include MR, x-ray, angiography, fluoroscopy, PET, SPECT, or ultrasound. The medical imaging system 11 is configured to acquire the medical imaging data for CPR. The data is acquired by scanning the patient and/or by receiving signals from the patient.

The memory 14 is a buffer, cache, RAM, removable media, hard drive, magnetic, optical, database, or other now known or later developed memory. The memory 14 is a single device or group of two or more devices. The memory 14 is within the system 11, part of a computer with the processor 12, or is outside or remote from other components.

The memory 14 stores the data representing the patient. The data represents multiple tubular structures, such as a vessel tree with the corresponding multiple branches, intervening anatomy, such as the heart or other tissue, bone or fluid, and any foreign structures, such as a stent. The data represents a three-dimensional region. Any format may be used, such as voxels interpolated to a three-dimensional grid or data representing parallel or non-parallel planes. The data may be segmented, such as including locations known to be for different anatomy. For example, the locations of the vessel tree are known. The memory 14 stores data resulting from processes, such as storing the filtered data, geometric forms, hierarchal spatial index, and/or rendered images.

The memory 14 is additionally or alternatively a non-transitory computer readable storage medium with processing instructions. The memory 14 stores data representing instructions executable by the programmed processor 12 for curved reformation imaging. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 12 is a general processor, digital signal processor, three-dimensional data processor, graphics processing unit, application specific integrated circuit, field programmable gate array, digital circuit, analog circuit, combinations thereof, or other now known or later developed device for processing medical data. The processor 12 is a single device, a plurality of devices, or a network. For more than one device, parallel or sequential division of processing may be used. Different devices making up the processor 12 may perform different functions, such as creating the curved reformation sub-volume by one processor and rendering by another processor. In one embodiment, the processor 12 is a control processor or other processor of the medical imaging system 11. The processor 12 operates pursuant to stored instructions to perform various acts described herein, such as acts of FIG. 3.

The processor 12 is configured to create a sub-volume for CPR using a monotonicity constraint, sub-volume formation using a convex hull, selection of voxels from tubular structure over other structures, and/or rapid selection using hierarchal spatial indexing. For example, the processor 12 filters radii along of each of the multiple tubular structures with a monotonicity constraint. A low pass filter of the radii derived from the data is caused to never get smaller or never get larger. In one embodiment, the radii are filtered by the processor 12 as part of fitting geometric representations of segments of the tubular structures to the tubular structures. The radius or radii of the geometric representation are constrained to have monotonicity as part of the fitting along the sequence of vessel segments.

The processor 12 is configured to perform curved reformation of the data as a function of the filtered radii or without filtering of the radii. Using the geometric representations fitted to different segments of the tubular structure, using the scan data, or using a surface identified from the scan data, a convex hull is fitted to the tubular structure. The convex hull is formed around and between the different branches of the tubular structure. Rather than relying on longitudinal planes along each branch, the convex hull extends between the branches and/or between parts of a same branch due to curvature, isolating the tubular structure and data along curved surfaces stretched between parts of the tubular structure. This convex hull identifies locations within the scan volume. These locations are used for rendering an image.

The processor 12 is configured to render the image from the selected sub-set of the curved planar reformation. The scan data representing the locations makes up the sub-set. To avoid some artifacts, the rendering may include verification that the scan data used for an image location responsive to the tubular structure is from the tubular structure. The processor 12 checks each rendering path for whether a further selection is to occur to distinguish between data representing tubular structure from other structure.

In one embodiment, the segments or geometric representations of the tubular structure are spatially organized in a hierarchal data structure, such as an octree or kd-tree. This structure may be used to avoid comparing each voxel along a given rendering path to all of the tubular structure. Instead, the voxel is checked against only parts of the tubular structure in a limited surrounding region (e.g., geometric representations in the neighborhood as defined by the hierarchal data structure). By checking against the geometric representation rather than surfaces defined by the lumen as represented in the scan data, the check may be even more rapid or less computationally expensive. The image is rendered from the selected scan data of the sub-set of the curved planar reformation so that data representing the tubular structures and not representing the intervening anatomy is used, when available.

The processor 12 is configured to generate an image. The image is generated from the rendering. The image is a volume or three-dimensional rendering. A curved reformatted image is generated.

The display 16 is a CRT, LCD, plasma, projector, printer, or other output device for showing an image. The display 16 displays an image of the curved reformation. A measure based on the tubular structure, such as flow quantity, may be displayed in a chart, graph, and/or on an image. The image may include other information, such as an overlay or color coding from flow information. The CPR is displayed in grayscale, but may be mapped to any color scale.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:
1. A method for curved reformation imaging, the method comprising:
   fitting, by a processor, geometric forms to outer wall segments of a vessel tree of a patient represented by scan data;
   generating, by the processor, a convex hull around the fit geometric forms from the fit geometric forms;
   identifying, by the processor, the scan data that represents the convex hull; and
   rendering an image from the identified scan data.

2. The method of claim 1 wherein fitting comprises fitting a sequence of truncated cones, cylinders, or n-sided prismoids to the outer wall segments of the vessel tree.

3. The method of claim 1 wherein fitting comprises:
enforcing monotonicity of radii of sequential geometric forms along a branch of the vessel tree; and
low pass filtering the radii as a function of distance along the branch.

4. The method of claim 1 wherein generating the convex hull comprises modeling formation of an elastic material around and between the geometric forms of the vessel tree such that the convex hull contacts the geometric forms and extends between geometric forms of different branches of the vessel tree.

5. The method of claim 1 wherein identifying comprises selecting voxels along the convex hull and not selecting voxels displaced from the convex hull.

6. The method of claim 1 wherein rendering comprises:
locating a nearest and farthest of the identified scan data along a view direction;
comparing a distance between the nearest and farthest along the view direction to a threshold;
where the distance is below the threshold, rendering with maximum intensity projection along the view direction;
where the distance is above the threshold, rendering with maximum intensity projection along the view direction with identified scan data representing the vessel tree and not with identified scan data representing locations outside the vessel tree.

7. The method of claim 1 wherein rendering comprises determining whether the identified scan data along each of a plurality of rendering paths belongs to the vessel tree and rendering only from the identified scan data belonging to the vessel tree when available along the rendering path.

8. The method of claim 7 wherein rendering further comprises separating the geometric forms into a hierarchal spatial index of progressively smaller sub-divisions, and wherein determining comprises finding a smallest of the sub-divisions where at least one of the geometric forms is within a distance of a voxel and determining whether the voxel is in or out of the at least one geometric form, the voxel being in the at least one geometric form comprising belonging to the vessel tree and the voxel being out of the at least one geometric form comprising not belonging to the vessel tree.

9. The method of claim 8 wherein separating comprises creating an octree or kd-tree data structure.

10. The method of claim 1 further comprising:
separating the geometric forms into a hierarchal spatial index of progressively smaller sub-divisions; and
selecting a sub-set of the geometric forms based on membership in larger of the sub-divisions;
wherein rendering comprises rendering from the identified scan data for the sub-set and not the geometric forms not members of the sub-set.

11. In a non-transitory computer readable storage medium having stored therein data representing instructions executable by a programmed processor for curved reformation imaging, the storage medium comprising instructions for:

obtaining data representing a volume of a patient with at least one tubular structure;
creating a sub-volume with curved reformation along the at least one tubular structure;
rendering an image of the volume from the sub-volume wherein the rendering is a function of whether the voxels of the sub-volume are in or out of the at least one tubular structure, wherein the rendering comprises selecting the voxels for a first tubular structure and not for a second tubular structure using a hierarchal data structure of tubular structures by size; and
displaying the image.

12. The non-transitory computer readable storage medium of claim 11 wherein the at least one tubular structure comprises a vessel tree with at least two branches, and wherein creating the sub-volume comprise generating a convex hull fit around and extending between the at least two branches.

13. The non-transitory computer readable storage medium of claim 11 wherein creating the sub-volume comprises fitting a sequence of representations of a geometric shape and creating the sub-volume from the curved reformation using the fitted sequence of the representations of the geometric shape.

14. The non-transitory computer readable storage medium of claim 11 wherein creating the sub-volume comprises fitting a sequence of representations of a geometric shape, and wherein selecting comprises selecting as a function of the representations position relative to the voxels within the hierarchal data structure.

15. The non-transitory computer readable storage medium of claim 11 wherein rendering comprises rendering for only a portion of the at least one tubular structure using the hierarchal data structure.

16. The non-transitory computer readable storage medium of claim 11 wherein creating the sub-volume comprises imposing a monotonicity constraint on the at least one tubular structure.

17. A system for curved reformation imaging, the system comprising:
a memory operable to store data representing multiple tubular structures and intervening anatomy;
a processor configured to filter radii along of each of the multiple tubular structures with a monotonicity constraint, and configured to perform curved reformation of the data as a function of the filtered radii; and
a display configured to display an image of the curved reformation.

18. The system of claim 17 wherein the processor is configured to filter radii as part of fitting geometric representations to segments of the tubular structures, the geometric representations being fit with the filtered radii, and configured to perform the curved reformation by fitting a convex hull to the geometric representations.

19. The system of claim 17 wherein the processor is configured to render the image from a selected sub-set of the curved reformation, the selected sub-set selected based on representing the tubular structures and not representing the intervening anatomy in a hierarchal data structure.

* * * * *